US010363818B2

(12) United States Patent
Coser et al.

(10) Patent No.: US 10,363,818 B2
(45) Date of Patent: Jul. 30, 2019

(54) DISPLAY UNIT FOR VEHICLE

(75) Inventors: Nathaniel Coser, Palo Alto, CA (US);
Erik Glaser, San Francisco, CA (US);
William Brian Lathrop, San Jose, CA (US); Maria Mejia, Palo Alto, CA (US)

(73) Assignees: VOLKSWAGEN AG, Wolfsburg (DE);
AUDI AG, Ingolstadt (DE)

( * ) Notice: Subject to any disclaimer, the term of this patent is extended or adjusted under 35 U.S.C. 154(b) by 331 days.

(21) Appl. No.: 13/471,408

(22) Filed: May 14, 2012

(65) Prior Publication Data

US 2012/0287664 A1  Nov. 15, 2012

Related U.S. Application Data (60) Provisional application No. 61/486,136, filed on May 13, 2011.

(51) Int. Cl.
*B60K 35/00* (2006.01)
*B60K 37/02* (2006.01)

(52) U.S. Cl.
CPC .............. *B60K 35/00* (2013.01); *B60K 37/02* (2013.01); *B60K 2350/106* (2013.01); *B60K 2350/203* (2013.01); *B60K 2350/206* (2013.01); *B60K 2350/2017* (2013.01); *Y10T 156/10* (2015.01)

(58) Field of Classification Search
CPC .......... B60Q 3/002; B60Q 3/004; B60Q 3/04; B60Q 3/042; B60Q 3/044; B60Q 3/14; F21S 48/1233; F21S 48/1291; G02B 6/0058–6/0063; Y10T 156/10

USPC ......... 362/23.01, 23.09, 23.16, 23.18, 23.19, 362/23.2, 23.21, 242, 489, 551, 436–442; 359/242; 385/115–121

See application file for complete search history.

(56) References Cited

U.S. PATENT DOCUMENTS

| | | | |
|---|---|---|---|
| 4,434,932 A | 3/1984 | Nara et al. | |
| 4,832,427 A | 5/1989 | Nanba et al. | |
| 5,644,289 A * | 7/1997 | Frehner et al. | 340/461 |
| 6,152,066 A * | 11/2000 | Knoll et al. | 116/288 |
| 6,205,275 B1 * | 3/2001 | Melville | 385/43 |
| 6,542,146 B1 | 4/2003 | Toffolo et al. | |
| 6,667,446 B1 | 12/2003 | Schuberth et al. | |
| 7,025,482 B2 * | 4/2006 | Yamashita et al. | 362/511 |
| 7,056,203 B2 | 6/2006 | Shibata et al. | |
| 7,125,132 B2 * | 10/2006 | Wang | 362/23 |
| 7,190,390 B2 | 3/2007 | Hett et al. | |
| 7,198,393 B2 | 4/2007 | Tubidis et al. | |
| 7,232,245 B2 | 6/2007 | Suzuki et al. | |
| 7,273,278 B2 | 9/2007 | Fronzek | |
| 7,357,095 B1 * | 4/2008 | Fong et al. | 116/286 |

(Continued)

FOREIGN PATENT DOCUMENTS

| | | |
|---|---|---|
| CN | 101535087 A | 9/2009 |
| DE | 100 26 136 | 11/2000 |

(Continued)

OTHER PUBLICATIONS

English Machine Translation of JP 2008191274 provided by Espacenet (Year: 2008).*

*Primary Examiner* — Zheng Song
(74) *Attorney, Agent, or Firm* — Hunton Andrews Kurth LLP (57) ABSTRACT

A display unit for a vehicle includes an electronic display and a light guide coupled to a portion of the display.

18 Claims, 6 Drawing Sheets

(56) References Cited

U.S. PATENT DOCUMENTS

| | | | |
|---|---|---|---|
| 7,357,096 B2* | 4/2008 | Tane | 116/288 |
| 7,525,446 B2 | 4/2009 | Shibata | |
| 7,534,000 B1* | 5/2009 | Adachi et al. | 362/23.13 |
| 7,592,972 B2* | 9/2009 | Eckardt et al. | 345/32 |
| 7,661,859 B2 | 2/2010 | Nakagawa | |
| 7,671,851 B1 | 3/2010 | Pryor | |
| 7,671,859 B2* | 3/2010 | Birman et al. | 345/426 |
| 8,016,441 B2* | 9/2011 | Birman et al. | 362/26 |
| 2001/0045278 A1 | 11/2001 | Iwamoto et al. | |
| 2002/0041491 A1* | 4/2002 | Nakagawa et al. | 362/23 |
| 2004/0129197 A1* | 7/2004 | Nakagawa et al. | 116/28 R |
| 2005/0212721 A1* | 9/2005 | Kuwahara et al. | 345/32 |
| 2006/0018109 A1* | 1/2006 | Kageyama et al. | 362/23 |
| 2006/0044778 A1* | 3/2006 | Muramatsu | 362/23 |
| 2006/0066250 A1* | 3/2006 | Wang | 315/129 |
| 2006/0077068 A1* | 4/2006 | Harada et al. | 340/815.86 |
| 2006/0126320 A1* | 6/2006 | Fong et al. | 362/27 |
| 2007/0279243 A1* | 12/2007 | Araki | G01D 7/002 340/815.58 |
| 2008/0002388 A1* | 1/2008 | Sullivan | 362/30 |
| 2008/0123322 A1* | 5/2008 | Tane | B60K 35/00 362/23.01 |
| 2008/0135206 A1 | 6/2008 | Alves et al. | |
| 2008/0144174 A1* | 6/2008 | Lucente | H04N 13/0406 359/463 |
| 2008/0278803 A1* | 11/2008 | Kraus | B60K 35/00 359/440 |
| 2009/0015736 A1* | 1/2009 | Weller et al. | 349/11 |
| 2009/0078190 A1 | 3/2009 | Fournier | |
| 2009/0091513 A1 | 4/2009 | Kuhn | |
| 2009/0219734 A1* | 9/2009 | Sawada et al. | 362/616 |
| 2010/0059348 A1 | 3/2010 | Hauf | |
| 2011/0025488 A1 | 2/2011 | Leon | |
| 2012/0057342 A1* | 3/2012 | Shih | 362/235 |
| 2013/0179811 A1 | 7/2013 | Nagara et al. | |

FOREIGN PATENT DOCUMENTS

| | | |
|---|---|---|
| DE | 601 03 156 | 5/2005 |
| DE | 10 2004 041 119 | 3/2006 |
| DE | 10 2005 043 205 | 3/2007 |
| DE | 10 2005 043 310 | 10/2007 |
| DE | 10 2007 005 362 B3 | 2/2008 |
| DE | 10 2007 056 450 A1 | 10/2008 |
| DE | 10 2008 017 051 A1 | 10/2009 |
| DE | 10 2008 032 061 | 1/2010 |
| EP | 0 583 392 | 3/1998 |
| EP | 1 655 750 A2 | 5/2006 |
| EP | 1 573 374 | 2/2007 |
| EP | 1 888 974 A2 | 2/2008 |
| JP | 2008-191274 A | 8/2008 |
| WO | 2006/024748 A2 | 3/2006 |
| WO | 2007/053710 A2 | 5/2007 |
| WO | 2010/045411 | 4/2010 |

* cited by examiner

DISPLAY UNIT FOR VEHICLE

CROSS-REFERENCE TO RELATED APPLICATIONS

The present application claims the benefit of U.S. Provisional Patent Application Ser. No. 61/486,136, filed on May 13, 2011, which is expressly incorporated herein in its entirety by reference thereto.

FIELD OF THE INVENTION

The present invention relates to display units, e.g., for vehicles and to corresponding vehicles.

BACKGROUND INFORMATION

The amount of information to be conveyed to drivers in vehicles, such as cars, is continuously increasing. Conventionally, instrument panels are provided which show only a few values, like speed, fuel level or engine speed. Conventionally, gauges using pointers are frequently used. In recent years, additionally items like maps, Internet, efficiency measures such as driving recommendations and traffic flow data are additionally conveyed to a driver. This abundance of information has to be displayed to the driver in a flexible, easy-to-read manner in order to keep distraction for the driver at a minimum.

In order to more efficiently display this information, display screens have been incorporated in cockpits of vehicles, or even the complete information has been provided using such display screens, such that conventional physical gauges are replaced by corresponding images on the display screen. However, such display screens lack the three-dimensional properties of physical gauges and lose their visual appeal when the vehicle is turned off. On the other hand, the three-dimensional spatial separation of data in at least in some instances facilitates reading the conveyed information.

German Published Patent Application No. 10 2005 043 205 describes a display in which a magnifying lens is mounted above the display for viewing. This allows making the display smaller.

U.S. Pat. No. 7,525,446 describes a display device in which a decorative member is arranged on a display, for example, around a portion of the display displaying information, thus providing a three-dimensional appearance. The decorative member is illuminated by light passing through the display.

SUMMARY

Example embodiments of the present invention provide improved display units.

According to example embodiments of the present invention, a display unit for a vehicle includes: an electronic display configured to display information for an occupant of the vehicle; and a light guide coupled to at least a portion of the display to guide light representing at least part of the information to predetermined locations spaced apart from the electronic display for viewing.

Through the use of light guides coupled to the electronic display, light may be guided to the predetermined location thus creating a three-dimensional impression compared to the usually flat electronic display itself.

The display unit may include a further light guide coupled to a further portion of the display to guide light representing a further part of the information to a further predetermined location different from the predetermined location spaced apart from the electronic display for viewing. A distance of the further predetermined location from the electronic display may be equal to or different from a distance of the predetermined location from the display unit. In such an arrangement, through the use of different distances the three-dimensional impression may be enhanced.

The light guide and the further light guide may have the same general shape and configuration, but may also have different shapes.

In addition to the light guide and the further light guide, other light guides may also be present. In other words, the number of light guides is not limited to any particular number.

The light guide and/or the further light guide may have a bent shape to guide light in a non-straight manner. In such an arrangement, the flexibility for designing the display unit is increased.

The light guide and/or the further light guide may be fixed directly to the electronic display or may be fixed, for example, to a protective transparent cover of the electronic display. The light guide may include a first portion to guide light to predetermined locations having a first predetermined distance from the electronic display and a second portion configured to guide light to predetermined locations having a second distance from the electronic display. The first portion and the second portion may have circular shapes and/or be arranged in a concentric manner.

The light guide may be based on optical fibers, such as glass fibers, silica fibers, plastic fibers, etc. The light guide may include a plurality of optic fibers fused together.

The above summary is merely provided to give an overview over some features of some embodiments and is not to construed as limiting. In particular, other example embodiments may include different features than the ones mentioned above. Furthermore, features of the above-mentioned example embodiments may be combined unless specifically stated otherwise.

DETAILED DESCRIPTION

In the following, example embodiments of the present invention are described in more detail with reference to the Figures. The following description of example embodiments is not to be construed as limiting, but merely as being intended to provide some illustrative examples on how the present invention may be implemented. In particular, implementation is not limited to the example embodiments described hereinafter.

Features of various example embodiments described may be combined with each other unless specifically noted otherwise. On the other hand, describing an example embodiment with a plurality of features is not to be construed as indicating that all those features are necessary, as other example embodiments may include less features and/or alternative features.

Example embodiments described hereinafter may include an electronic display and a light guide. In the present context, an electronic display may show visible features, in particular, visible information such as text, graphics, indicators, etc. in response to electric signals. Electronic displays may include organic light emitting diode (OLED) displays, liquid crystal displays (LCD), or thin-film transistors (TFT) displays, etc.

A light guide generally is a device which guides light from a first location to a second location. Light guides typically use internal reflection, in particular, total internal reflection, caused at interfaces between materials having different refractive indices to guide the light. Conventional light guides include optical fibers, such as silica-based fibers, glass fibers or plastic fibers or so-called light pipes, which include a plurality of, for example, several hundreds to several thousands of individual optical fibers fixed together, for example, fused together. With such light pipes, light guides with a comparatively large diameter may be provided.

Figure 1:
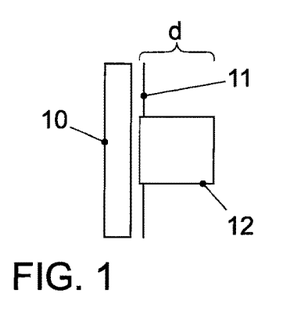
FIG. 1 schematically illustrates an example embodiment of the present invention.

FIG. 1 schematically illustrates a display unit for a vehicle according to an example embodiment of the present invention. The display unit of FIG. 1 includes an electronic display 10 for displaying information to a driver. The information may include information such as velocity of the vehicle, fuel level of the vehicle, navigation information, engine speed of the vehicle, map information or also information not directly related to driving, for example, information from the internet or information regarding radio stations.

Coupled with electronic display 10 is a light guide 12, for example, a light pipe, which guides light representing a portion of the information, e.g., the information displayed on electronic display 10 at the location where light pipe 12 is adjacent to electronic display 10, to predetermined locations at a distance d from electronic display 10 for viewing, thus creating a three-dimensional impression. The distance d in the example embodiment illustrated in FIG. 1 is determined by the dimension of light guide 12. Furthermore, a bezel 11 is provided covering portions of electronic display 10 which are not used for displaying information.

It should be noted that bezel 11 need not cover the complete area not covered by light guide 12, but other uncovered areas of electronic display 10 may exist for displaying information besides the information viewable via light guide 12. Various configurations and locations for light guides in display units for vehicles may be used. Some examples for such configurations will next be explained with reference to FIGS. 2A to 2F. The example embodiments of FIGS. 2A to 2F substantially show plan views of display units.

Throughout FIGS. 2A to 2F, 20 designates an electronic display, of which the contour is shown in FIGS. 2A to 2F. Electronic display 20 may be used for displaying various kinds of information to a driver, for example, the velocity of a vehicle, the engine speed of a vehicle, the fuel level of a vehicle, other information related to driving such as a cooling fluid temperature, as well as information not directly related to driving such as information of a tuned radio station, or outside temperature. The information may be displayed in a manner resembling conventional gauges using pointers for velocity or engine speed. For instance, a velocity may be displayed in a left part of electronic display 20, while an engine speed may be displayed in a right part of display 20.

Figure 2A:
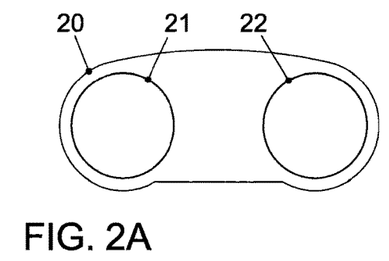
FIGS. 2A to 2F illustrate various example embodiments of the present invention.

In the example embodiment of FIG. 2A, two light guides 21, 22 each having a circular cross-section are provided, one in the left part of display 20 and one in the right part of display 20. For example, light guide 21 may serve to guide light corresponding to velocity information, and light guide 22 may be arranged to guide light corresponding to engine speed information, just to give an example. In this manner, by providing a three-dimensional appearance via the light guides 21, 22 in the example embodiment illustrated in FIG. 2A corresponding information, for example, velocity information and speed information, is highlighted.

Figure 2B:
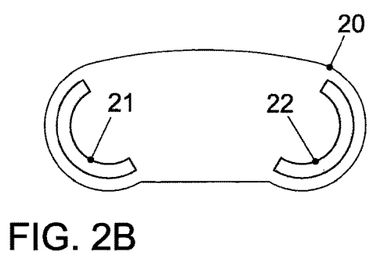

In the example embodiment illustrated in FIG. 2B, two semicircular rings 23, 24 are provided as light guides. Rings 23, 24 may, for example, be provided above portions of display 20 where scale for velocity or engine speed are displayed, or velocity/engine speed may be displayed by gradually filling the area covered by light guides 23, 24.

Figure 2C:
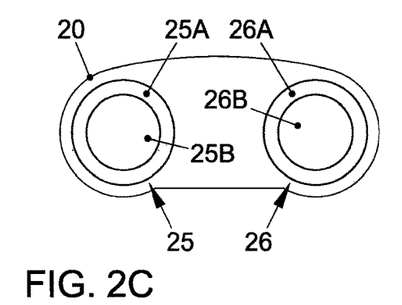

In the example embodiment illustrated in FIG. 2C, light guides 25, 26 are provided in locations similar to the locations of light guides 21, 22 illustrated in FIG. 2A. Light guide 25 includes an outer portion 25A and an inner portion 25B, and light guide 26 includes an outer portion 26A and an inner portion 26B. The thickness of the respective outer portion 25A, 26A may be different from, for example, smaller than, a thickness of the respective inner portion 25B, 26B. The thickness, in this respect, in the context of FIGS. 2A to 2F is the dimension perpendicular to the surface of display 20. In embodiment embodiments, the respective outer portion 25A, 26A may, for example, cover a scale of a displayed pointer gauge, and the inner portion 25B, 26B may cover a respective inner portion including the pointer of the respective gauge. However, other configurations are possible as well.

Figure 2D:
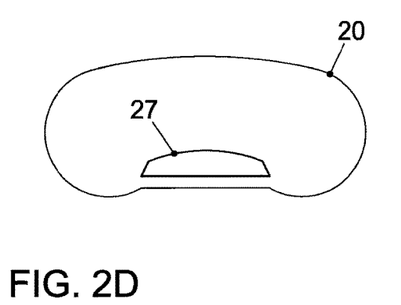

In the example embodiment illustrated in FIG. 2D, a light guide 27 is provided in a lower portion of display 20. At this portion of display 20, for example, a fuel level, a temperature and/or a time may be displayed.

Figure 2E:
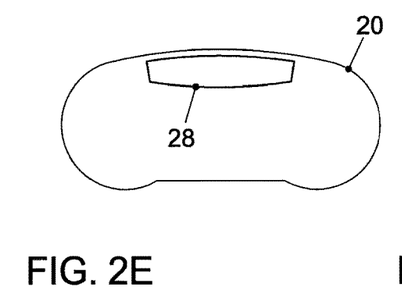

In the example embodiment illustrated in FIG. 2E, a light guide 28 is provided in an upper portion of display 20. In the upper portion of display 20, for example, a fuel level, a time and/or a temperature may be displayed.

Figure 2F:
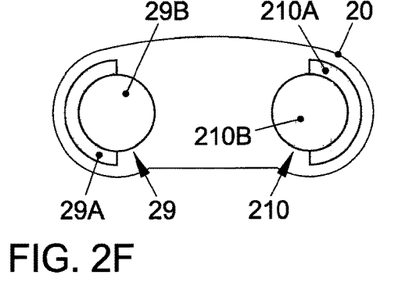

In the example embodiment illustrated in FIG. 2F, two light guides 29, 210 are provided. Light guide 29 includes an outer portion 29A and an inner portion 29B, and light guide 210 includes an outer portion 210A and an inner portion 210B, somewhat similar to the structure of light guides 25, 26 of the example embodiment illustrated in FIG. 2C. However, in contrast to the example embodiment illustrated in FIG. 2C, outer portion 29A, 210A surround their respective inner portions 29B, 210B only partially, e.g., in a semicircle as illustrated in FIG. 2F. Geometries other than semicircular, example, a quarter-circular, are also possible.

The thickness of outer portion 29A, 210A may be different, for example, smaller than, the thickness of inner portions 29B, 210B.

It should be noted that the example embodiments illustrated in FIGS. 2A to 2F may be combined with each other. For example, light guide 21 illustrated in FIG. 2A and light guide 24 illustrated in FIG. 2B may be provided, or light guide 28 illustrated in FIG. 2E and/or 27 illustrated in FIG. 2D may be provided additionally in the example embodiments illustrated in FIG. 2A, 2B, 2C or 2F.

Figure 3A:
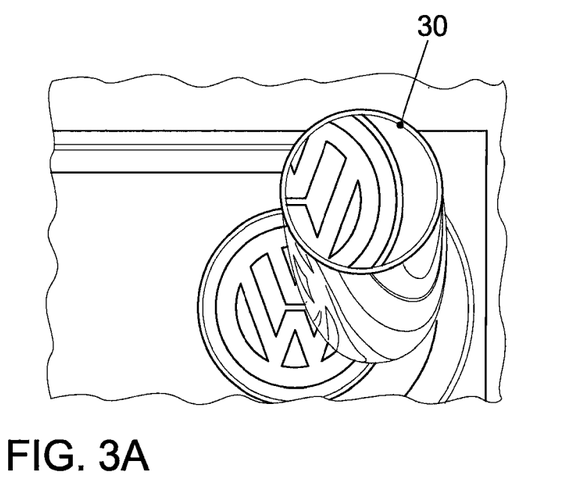
FIGS. 3A and 3B are views of light guides that may be provided in example embodiments of the present invention.
Figure 3B:
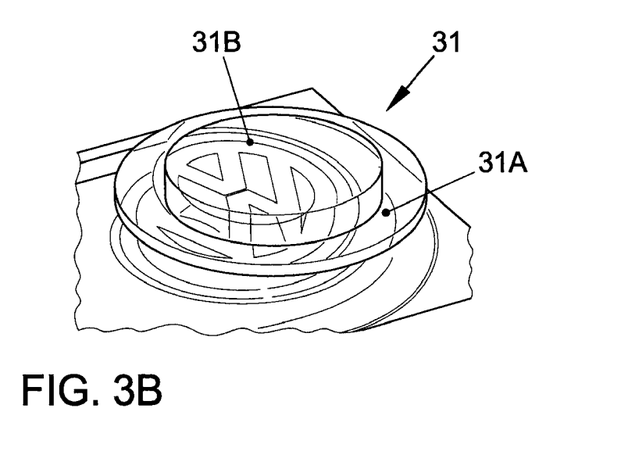

The visible effect provided by light guides, for example, light pipes, as mentioned in the previous example embodiments is illustrated in FIGS. 3A and 3B. FIG. 3A illustrates a light pipe 30 having a cylindrical shape, which may, for example, correspond to light guide 21 or 22 illustrated in FIG. 2A. As can be seen, the part of the logo covered by light pipe 30 can be seen at a distance from the original printing, e.g., at an end facet of the light pipe.

In FIG. 3B, a light pipe 31 including an outer portion 31A and an inner portion 31B is illustrated. The thickness of the inner portion 31B exceeds the thickness of the outer portion 31A. This has the visible effect, as illustrated in FIG. 3B, that the logo can be viewed in different levels, e.g., different portions can be seen at different distances from the print of the logo (which, in a display unit as discussed with reference to FIG. 1 or FIG. 2, would correspond to the level of the display). Light pipe 31 may, for example, be used as light guide 25, 26 in the example embodiment illustrated in FIG. 2C. Light guides such as light guide 31 illustrated in FIG. 3B may be made by bonding two cylindrical light guides having different diameters together, thus forming a two layer light guide.

Further example embodiments of display units will be described with reference to FIGS. 4A to 4H. FIGS. 4A to 4H each illustrate a side view of a display unit, e.g., a view similar to the view illustrated in FIG. 1 and perpendicular to the views illustrated in FIGS. 2A to 2F. Throughout FIGS. 4A to 4H, an electronic display, in the example embodiment shown a display based on organic light emitting diodes (OLEDs), bears reference numeral 40. In other example embodiments, other kinds of displays such as LCD or TFT displays may be used.

Figure 4A:
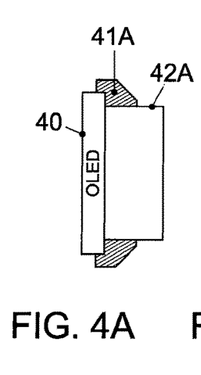
FIGS. 4A to 4H schematically illustrate example embodiments of the present invention.

In FIG. 4A, a light guide 42A, for example, a light pipe, having a rectangular cross-section, for example, a cylindrical light pipe as illustrated in FIG. 3A, is provided. A bezel 41A covers at least some portions of display 40 not covered by light guide 42A.

Figure 4B:
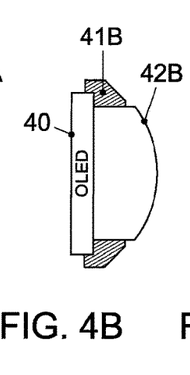

In the example embodiment illustrated in FIG. 4B, a light guide 42B and a bezel 41B are provided. The face opposite display 40 of light guide 42B is rounded as illustrated in FIG. 4B. Depending on these internal structure of the light guide, the visual effect thus achieved is different from the visual effect of a flat surface as illustrated in FIG. 4A. For example, an effect somewhat similar to the effect of a lens may be achieved, thus combining properties of a lens with those of a light guide.

Figure 4C:
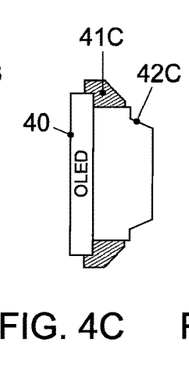

In the example embodiment illustrated in FIG. 4C, a bezel 41C and a light guide 42C are provided. Light guide 42C is somewhat similar to light guide 31 illustrated in FIG. 3B, with slanted faces between outer portion and inner portion.

Figure 4D:
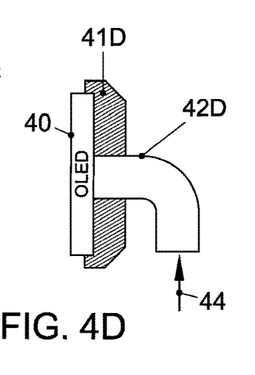

In FIG. 4D, a bezel 41D and a light guide 42D are provided. Light guide 42D is bent to provide the image around a corner, e.g., the image which represents information may, in FIG. 4D, be seen from the direction indicated by an arrow 44. This allows freedom of design regarding the placement of display 40 relative to an occupant of the vehicle for whom the information displayed on display 40 is intended.

Figure 4E:
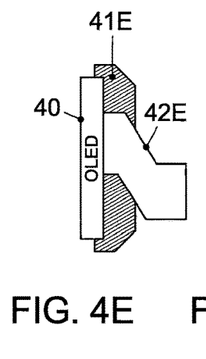

In FIG. 4E, a bezel 41E and a light guide 42E are illustrated. Light guide 42E has a double-bent cross-section as illustrated in FIG. 4E, such that the image generated by display 40 can be seen at a position displaced from its original position in the plane of display 40.

Figures 4F, 4G, 4H:
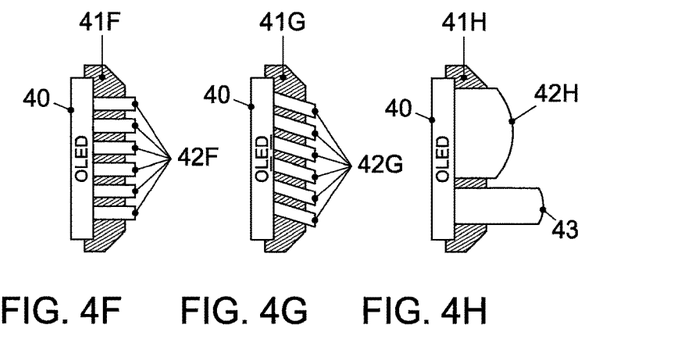

In FIG. 4F, a display unit includes a bezel 41F and a plurality of light guides 42F which all have a rectangular cross-section.

In FIG. 4G, the display unit includes a bezel 41G and light guides 42G having a trapezoidal cross-section. In FIG. 4H, a bezel 41H is provided together with light guides 42H and 43H having different diameters, e.g., dimensions parallel to the plane of display 40, and each having a rounded surface at the face opposite the face adjacent to display 40.

FIGS. 4A to 4H illustrate that a plurality of variations are possible in designing the light guide. It should be noted that the various possibilities illustrated in FIGS. 4A to 4H may be combined. For example, light guide 42E may have a rounded surface like light guide 42B, or any of the straight light guides illustrated may be bent as light guide 42D.

It also should be noted that the various cross-sections illustrated in FIGS. 4A to 4H may be used in any of the example embodiments illustrated in FIGS. 2A to 2F.

Figure 5:
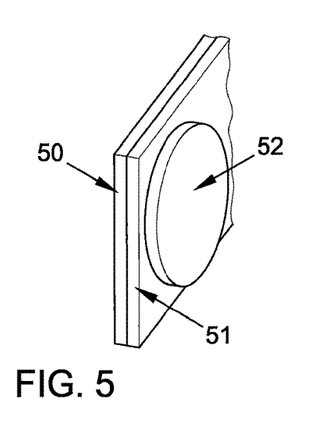
FIG. 5 is a perspective view of an example embodiment of the present invention.

It further should be noted that in case light pipes are used as light guides, interstitial material between the individual optical fibers of the light pipe may be selected to achieve desired light carrying properties of the light pipes. For example, by varying the interstitial material perceived contrast and viewing angle of the light pipe may be altered. In FIG. 5, a perspective view of an example embodiment is shown. In the example embodiment illustrated in FIG. 5, a display 50, for example, an OLED display, is covered by a fiber optic glass 51, e.g., a glass manufactured by fusing optical fibers together (e.g., substantially a thin light pipe), which has a cylindrical light pipe 52 formed thereon. In other words, in the example embodiment illustrated in FIG. 5, light pipes 52 and fiber optic glass 51 are substantially formed as a single light pipe, light pipe 52 protruding from the planar fiber optic glass 51. Fiber optic glass 51 is bonded to display 50. It should be noted that instead of a cylindrical shape for light pipe 52, any other shape may be used, for example any of the shapes discussed with reference to FIGS. 1 to 4.

Figure 6:
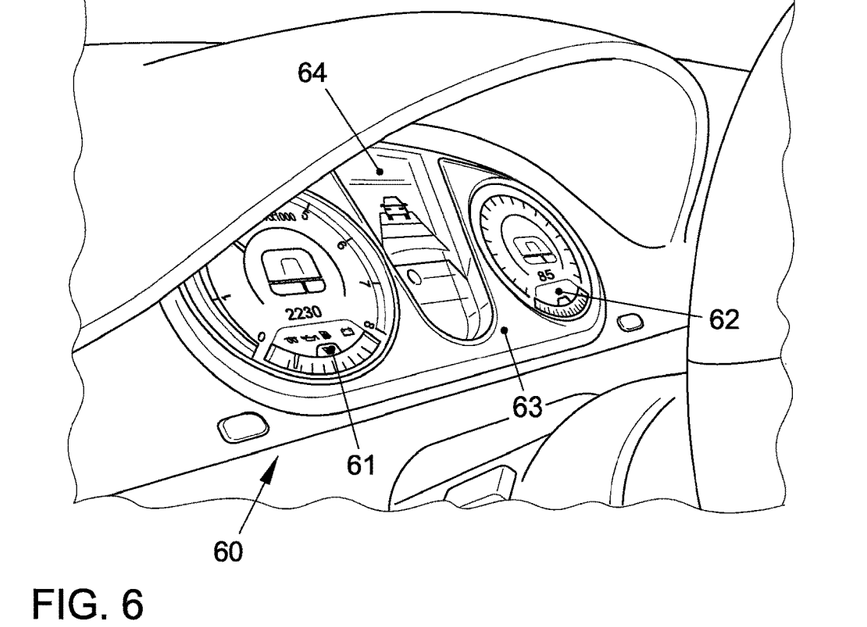
FIG. 6 shows a display unit according to an example embodiment of the present invention.

In FIG. 6, a display unit 60 according to an example embodiment incorporated in a cockpit of a car is illustrated. Display unit 60 includes an electronic display for displaying information, parts of which are covered by a bezel 63, other parts of which are covered by light guides 61, 62 and a further part 64 is left free. In the part covered by light guide 61, information such as temperature or engine speed is shown. In a portion covered by light guide 62, information such as current velocity or fuel level is shown. In portion 64, driving assistance information regarding the distance to a preceding vehicle is shown. As can be seen, the parts of display covered by light guides 61, 62, because of the light guiding properties thereof, appear closer to a viewer than the information displayed in portion 64 without a light guide, thus creating a three-dimensional impression.

Figure 7:
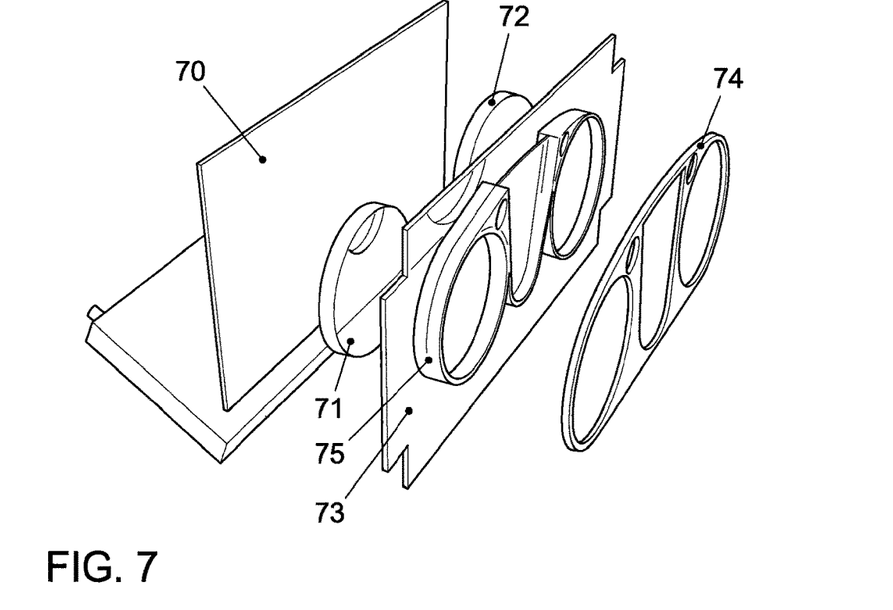
FIG. 7 is an exploded view of the display unit illustrated in FIG. 6

In FIG. 7, a possibility for manufacturing a display unit such as the one illustrated in FIG. 6 is indicated. An electronic display 70, in the example shown, an OLED display, is provided. Fiber optic light pipes 70, 72 are bonded to display 70 at the desired places. An aluminum plate 73 having lips 75 to surround the light pipes 71, 72 is fastened to display 70, for example, by using mounting holes at the side of aluminum plate 73 to fasten aluminum plate 73 to a support structure which in the vehicle is behind display 70. A bezel which may be made from back ABS plastic bearing reference 74 in FIG. 7 is provided covering portions of display 70 not used for displaying information.

Figure 8:
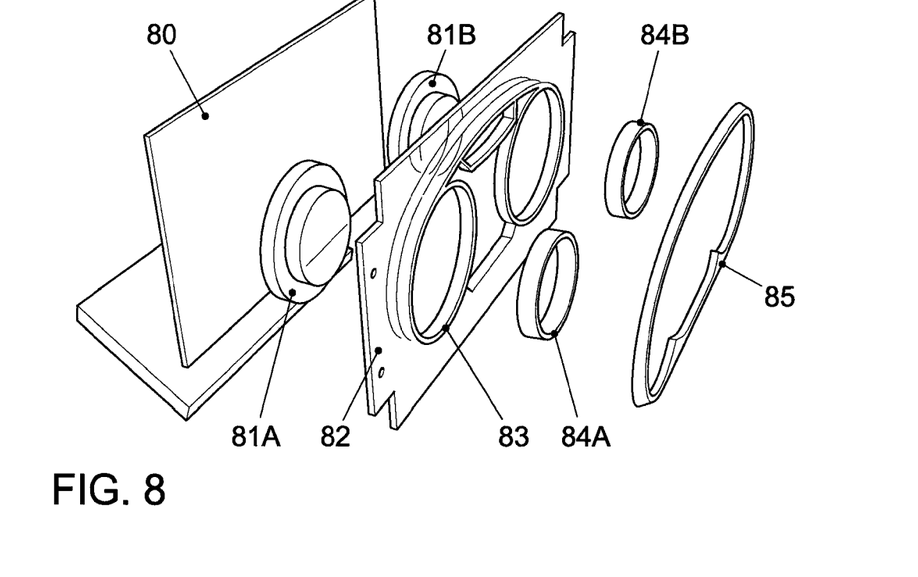
FIG. 8 is an exploded view of a display unit according to an example embodiment of the present invention.

In FIG. 8, the manufacture a different display according to an example embodiment is illustrated. In FIG. 8, a electronic display, for example, an OLED display, is provided. Light guides 81A, 81B which may be light pipes similar to the ones shown in FIG. 3B, e.g., light guides having an outer portion and an inner portion, are bonded to display 80. An aluminum plate 82 is fastened to display 80, aluminum plate 82 having aluminum rings 83 to surround the outer portions of light guides 81A, 81B. Plastic rings, for example, made from black ABS plastic, 84A and 84B are provided to surround the inner portions of light guides 81A and 81B, respectively. A bezel 85, which again may be made from black ABS plastic, is provided.

Figure 9:
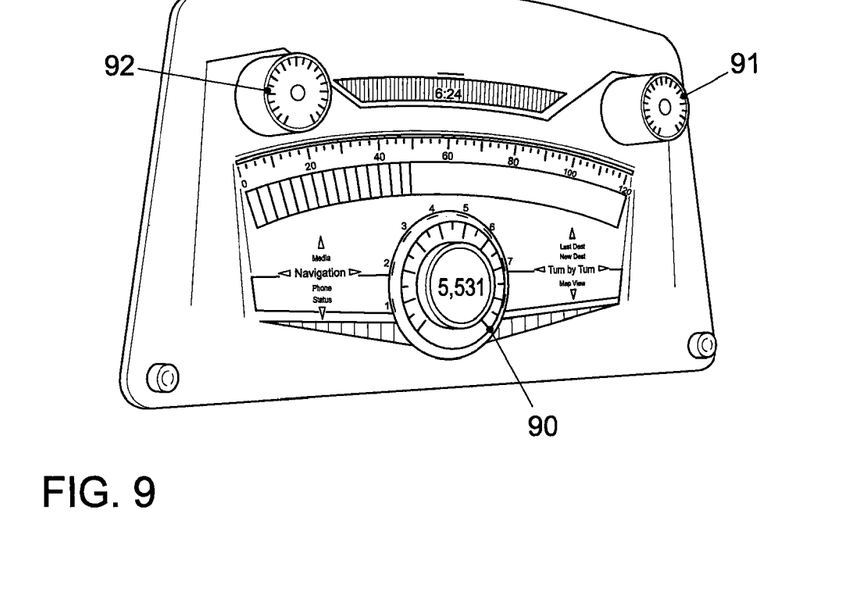
FIG. 9 illustrates a display unit according to an example embodiment of the present invention.

In FIG. 9, a further example for a display unit usable in a cockpit of a vehicle is illustrated. The display unit of FIG. 9 in particular may be used as a display unit for navigation systems. In the example illustrated in FIG. 9, a light guide 90 having an inner portion and an outer portion similar to light guide 31 illustrated in FIG. 3B and two cylindrical light guides 91, 92 are provided to give a three-dimensional appearance. Apart from the light guides, also portions of the display without light guides are used for displaying information.

Figure 10:
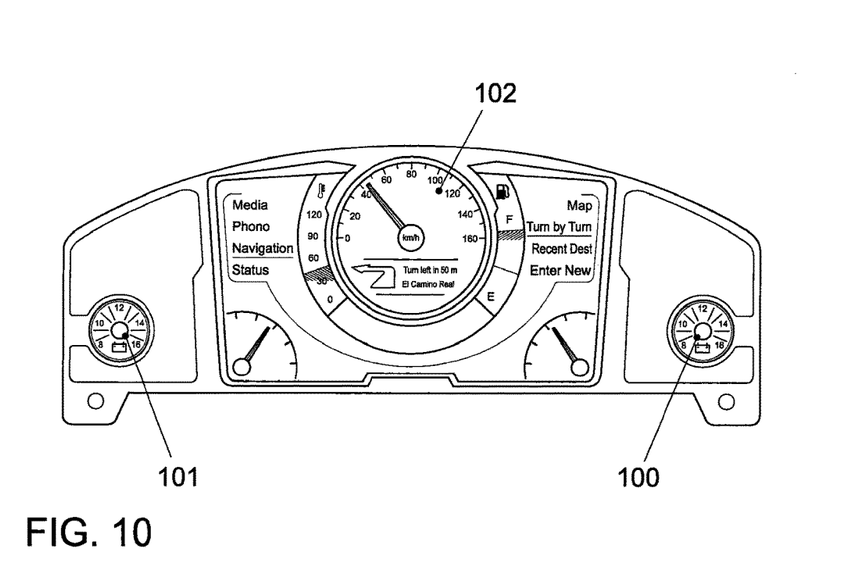
FIG. 10 shows a display unit according to a further example embodiment of the present invention.

In FIG. 10, a further example embodiment of a display unit usable in a cockpit of a car is illustrated. The display unit illustrated in FIG. 10 includes one larger diameter light guide 102 and two smaller diameters light guides 101, 100, all light guides having a substantially cylindrical shape. In the area of the display covered by light guide 102, velocity information and navigation information is displayed, while in the area covered by light guides 100, 101, for example, battery information may be displayed. Other portions of the display provide information without having a light guide superposed.

Figure 11:
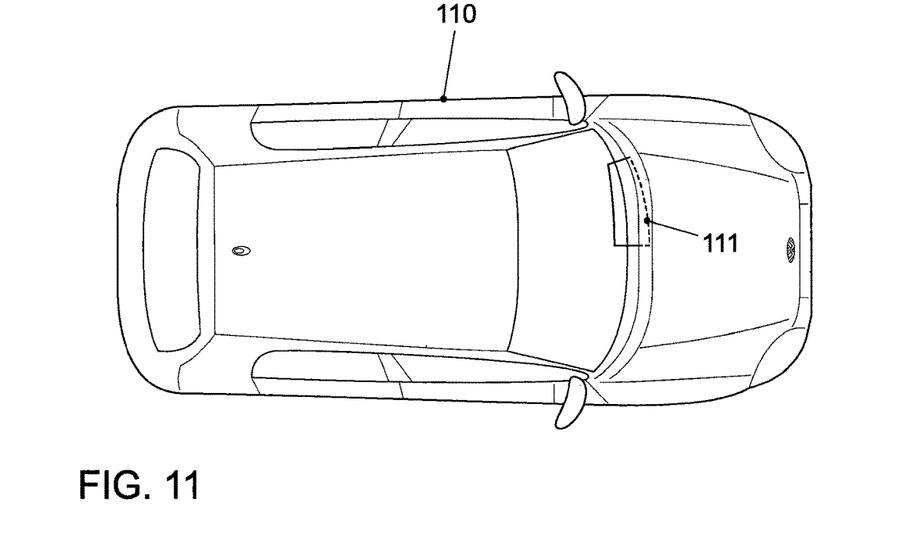
FIG. 11 shows a vehicle that includes a display unit according to an example embodiment of the present invention.

Display units as discussed above may be used in vehicles, for example, cars. For example, in FIG. 11, a vehicle 110 is illustrated in which a display unit 111 is provided as an instrument panel for a driver. Display unit 111 may be designed as discussed with respect to any of the example embodiments described with reference to FIGS. 1 to 10. It should be noted that display units as discussed herein may not only be used in cars, but also in other motor-driven vehicles, as in practically all kinds of motor driven vehicles, such as, motorcycles, ships or planes, instrument panels are needed to provide information to a driver of the vehicle.

While in some instances, specific materials have been used in the description, such as aluminum or ABS plastic, other materials, for example, other metals or other plastics, may be used as well.

As already emphasized, the above described example embodiments serve only as illustrative examples, and the scope hereof is not limited to these embodiments.

LIST OF REFERENCE NUMERALS

10 display
11 bezel
12 light guide
20 display
21-29;210 light guides
25A, 26A,29A, 210A outer portion
25B, 26B, 29B, 210B inner portion
30 light guide
31 light guide
31A outer portion
31B inner portion
40 display
41A-41H bezel
42A-42H light guide
44 arrow
43 light guide
50 display
51 fiber optic glass
52 light guide
60 display unit
61, 62 light guides
63 bezel
64 free area
70 display
71, 72 light guides
73 aluminum plate
74 bezel
75 aluminum rings
80 display
81A, 81B light guides
82 aluminum plate
83 aluminum rings
84A, 84B plastic rings
85 bezel
90, 91, 92 light guides
100, 101, 102 light guides
110 car
111 display unit

What is claimed is:

1. A display unit for a vehicle, comprising:

an electronic display configured to display information for an occupant of the vehicle;

a light guide configured as a light pipe, having a thickness, situated adjacent to a portion of a displaying face of the display, and configured to guide light from the portion of the displaying face of the display representing a part of the information displayed on the display from a first location at the display through the thickness of the light guide, by internal reflection, to a predetermined location spaced apart from the electronic display; and a further light guide configured as a light pipe including at least one optical fiber situated adjacent to a further portion of the displaying face of the display and configured to guide light from the further portion of the displaying face of the display representing at least another part of the information to a further predetermined location spaced apart from the electronic display, the further predetermined location being different from the predetermined location;

wherein a display end of the light guide is provided at a distance from the electronic display, the distance based on a dimension of the light guide, the light guided from the portion of the displaying face of the display by the light guide being displayed at the display end of the light guide closer in view than the information displayed on the display outside of the portion of the displaying face of the display situated adjacent to the light guide, such that the displayed information appears three dimensional; and wherein the light guide includes a surface provided parallel and adjacent to the portion of the displaying face of the display, the light guide further including a first portion and a second portion, a thickness of the first portion extending from the surface in a direction perpendicular to the surface being smaller than a thickness of the second portion from the surface in the direction perpendicular to the display surface of the electronic display.

2. The display unit according to claim 1, wherein the first portion and the second portion are cylindrical.

3. The display unit according to claim 2, wherein the first portion at least partially surrounds the second portion.

4. The display unit according to claim 3, wherein the second portion and the first portion are arranged concentrically.

5. The display unit according to claim 1, wherein the light guide includes a plurality of optical fibers fused together.

6. The display unit according to claim 1, wherein a distance of the further predetermined location to the electronic display is different from a distance of the predetermined location to the electronic display.

7. The display unit according to claim 1, wherein the light guide has a cylindrical shape, a ring shape, an elongate shape, and/or a section of a ring shape.

8. The display unit according to claim 1, wherein a surface of a face of the light guide opposite a face facing the electronic display has a flat shape and/or a rounded shape.

9. The display unit according to claim 1, wherein the light guide is bonded to the electronic display.

10. The display unit according to claim 1, wherein the light guide includes a planer portion covering a surface of the electronic display and a further portion protruding from the planer portion.

11. The display unit according to claim 1, further comprising a bezel covering parts of the electronic display.

12. The display unit according to claim 11, wherein other parts of the display remain uncovered by both the bezel and the light guide such that information is displayed on the electronic display.

13. The display unit according to claim 1, wherein the light guide has a band tape.

14. A vehicle, comprising:
   a display unit configured to display information to a driver of the vehicle, the display unit including:
      an electronic display configured to display information for the driver;
      a light guide configured as a light pipe, having a thickness, situated adjacent to a portion of a displaying face of the electronic display and configured to guide light from the portion of the displaying face of the display representing part of the information displayed on the display from a first location at the display through the thickness of the light guide, by internal reflection, to a predetermined location spaced apart from the electronic display; and
      a further light guide configured as a light pipe including at least one optical fiber situated adjacent to a further portion of the displaying face of the display and configured to guide light from the further portion of the displaying face of the display representing at least another part of the information to a further predetermined location spaced apart from the electronic display, the further predetermined location being different from the predetermined location;
   wherein a display end of the light guide is provided at a distance from the electronic display, the distance based on a dimension of the light guide, the light guided from the portion of the displaying face of the display by the light guide being displayed at the display end of the light guide closer in view than the information displayed on the display outside of the portion of the displaying face of the display situated adjacent to the light guide, such that the displayed information appears three dimensional; and
   wherein the light guide includes a surface provided parallel and adjacent to the portion of the displaying face of the display, the light guide further including a first portion and a second portion, a thickness of the first portion extending from the surface in a direction perpendicular to the surface being smaller than a thickness of the second portion from the surface in the direction perpendicular to the display surface of the electronic display.

15. The vehicle according to claim 14, wherein the light guide includes a plurality of optical fibers.

16. A method for manufacturing a display unit, comprising:
   providing an electronic display; and
   bonding a light guide configured as a light pipe, having a thickness, to a portion of a displaying face of the electronic display to arrange the light guide to guide light from the portion of the displaying face of the display representing a portion of information displayed on the electronic display from a first location at the electronic display through the thickness of the light guide, by internal reflection, to predetermined locations spaced apart from the electronic display;
   bonding a further light guide configured as a light pipe including at least one optical fiber situated adjacent to a further portion of the displaying face of the display and configured to guide light from the further portion of the displaying face of the display representing at least another part of the information to a further predetermined location spaced apart from the electronic display, the further predetermined location being different from the predetermined location;
   wherein a display end of the light guide is provided at a distance from the electronic display, the distance based on a dimension of the light guide, the light guided from the portion of the displaying face of the display by the light guide being displayed at the display end of the light guide closer in view than the information displayed on the display outside of the portion of the displaying face of the display situated adjacent to the light guide, such that the displayed information appears three dimensional; and
   wherein the light guide includes a surface provided parallel and adjacent to the portion of the displaying face of the display, the light guide further including a first portion and a second portion, a thickness of the first portion extending from the surface in a direction perpendicular to the surface being smaller than a thickness of the second portion from the surface in the direction perpendicular to the display surface of the electronic display.

17. The method according to claim 16, wherein the light guide includes a plurality of optical fibers.

18. The method according to claim 16, further comprising fixing a bezel to the electronic display.

* * * * *